United States Patent
Ostrum et al.

(10) Patent No.: US 11,027,855 B2
(45) Date of Patent: Jun. 8, 2021

(54) SYSTEMS AND METHODS FOR MONITORING LOW SPEED OF A ROTORCRAFT

(75) Inventors: Gary A. Ostrum, Bellevue, WA (US); Yasuo Ishihara, Kirkland, WA (US); Steve C. Johnson, North Bend, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1502 days.

(21) Appl. No.: 13/585,276

(22) Filed: Aug. 14, 2012

(65) Prior Publication Data
US 2014/0052314 A1    Feb. 20, 2014

(51) Int. Cl.
*B64D 43/02*    (2006.01)

(52) U.S. Cl.
CPC .................. *B64D 43/02* (2013.01)

(58) Field of Classification Search
CPC ............... B64D 43/02; G08B 21/182
See application file for complete search history.

(56) References Cited

U.S. PATENT DOCUMENTS

| 4,034,605 A | 7/1977 | Green |
| 4,774,515 A * | 9/1988 | Gehring ............... G01S 5/0247 342/53 |
| 5,225,829 A | 7/1993 | Bateman |
| 5,912,627 A * | 6/1999 | Alexander ................ 340/815.4 |
| 7,714,744 B1 * | 5/2010 | Wichgers ..................... 340/965 |
| 8,234,020 B1 * | 7/2012 | Wichgers et al. .............. 701/9 |
| 2005/0206533 A1 | 9/2005 | Roger et al. |
| 2006/0089761 A1 | 4/2006 | Pettigrew et al. |
| 2008/0039988 A1 * | 2/2008 | Estabrook et al. ............ 701/14 |

FOREIGN PATENT DOCUMENTS

| CN | 101968910 A | 2/2011 |
| EP | 1950718 A1 | 7/2008 |
| WO | 2011078847 A1 | 6/2011 |

OTHER PUBLICATIONS

EP Search Report for Application No. EP 13178433.2 dated Nov. 24, 2014.
Varnes D et al: "Pilot crew aids for the H-60 helicopter" Digital Avionics Systems Conference, 1999 Proceedings. 18th St. Louis, MO, USA Oct. 24-29, 1999, Piscataway, NJ, USA, IEEE, US, vol. c. 2-7 vol. 1 Oct. 24, 1999 (Oct. 24, 1999), pp. 4.D.4.1, XP010501220, DOI: 10.1109/DASC.1999.863734 ISBN: 978-0-7803-5749-5*Paragraphs under "Vortex-Ring State Warning System".
EP Examination Report for Application No. EP 13178433.2 dated Jun. 12, 2015.
EP Examination Report for Application No. EP 13178433.2 dated Dec. 11, 2014.

(Continued)

*Primary Examiner* — Charles J Han
(74) *Attorney, Agent, or Firm* — Lorenz & Kopf, LLP

(57) ABSTRACT

Systems and methods to provide alerts when a rotorcraft is in a low airspeed condition. During takeoff or go-around, an aural alert is provided to the pilot before the aircraft slows to less than the effective translational lift speed. The aural, visual, and/or tactile alert gets the pilot's attention to manage the aircraft's airspeed before it is too late in this critical flight phase.

19 Claims, 3 Drawing Sheets

(56) References Cited

OTHER PUBLICATIONS

Chinese Office Action for Application No. 201310350591.0 dated May 23, 2016.
Chinese Office Action for Application No. 201310350591.0 dated Jan. 23, 2017.
Chinese Office Action for Application No. 201310350591.0 dated Aug. 11, 2017.
Chinese Office Action, Decision on Rejection, for Application No. 201310350591.0 dated Feb. 14, 2018.

* cited by examiner

SYSTEMS AND METHODS FOR MONITORING LOW SPEED OF A ROTORCRAFT

BACKGROUND OF THE INVENTION

As the helicopter speed decreases below effective translational lift (ETL) speed, the rotor efficiency becomes less effective. In many helicopter accidents, pilots get disoriented, and often drop the helicopter's speed after takeoff or during a go-around, without noticing it. In a lot of cases, this insidious slow loss of airspeed is not detected by the pilots and results in a loss of performance, leading to a crash.

SUMMARY OF THE INVENTION

During takeoff or go-around an aural alert is provided to the pilot before the aircraft slows to less than the effective translational lift speed. The aural and/or visual alert gets the pilot's attention to manage the aircraft's airspeed before it is too late in this critical flight phase.

This new airspeed monitor can be implemented in the helicopter's enhanced ground-proximity warning system (EGPWS). The helicopter's EGPWS currently consumes all of the aircraft's sensors required to perform the function and currently provides aural alerts in the cockpit. The monitor would be enabled after takeoff or go-around, after the aircraft has reached a predetermined speed and the aircraft is less than a predetermined height, and would then provide an alert, when computed airspeed decreases to below a predetermined speed (a value just above the effective translational lift speed). The alert is provided sooner when the engine(s) is operating at high torque setting.

BRIEF DESCRIPTION OF THE DRAWINGS

Preferred and alternative embodiments of the present invention are described in detail below, with reference to the following drawings.

DETAILED DESCRIPTION OF THE INVENTION

Figure 1:
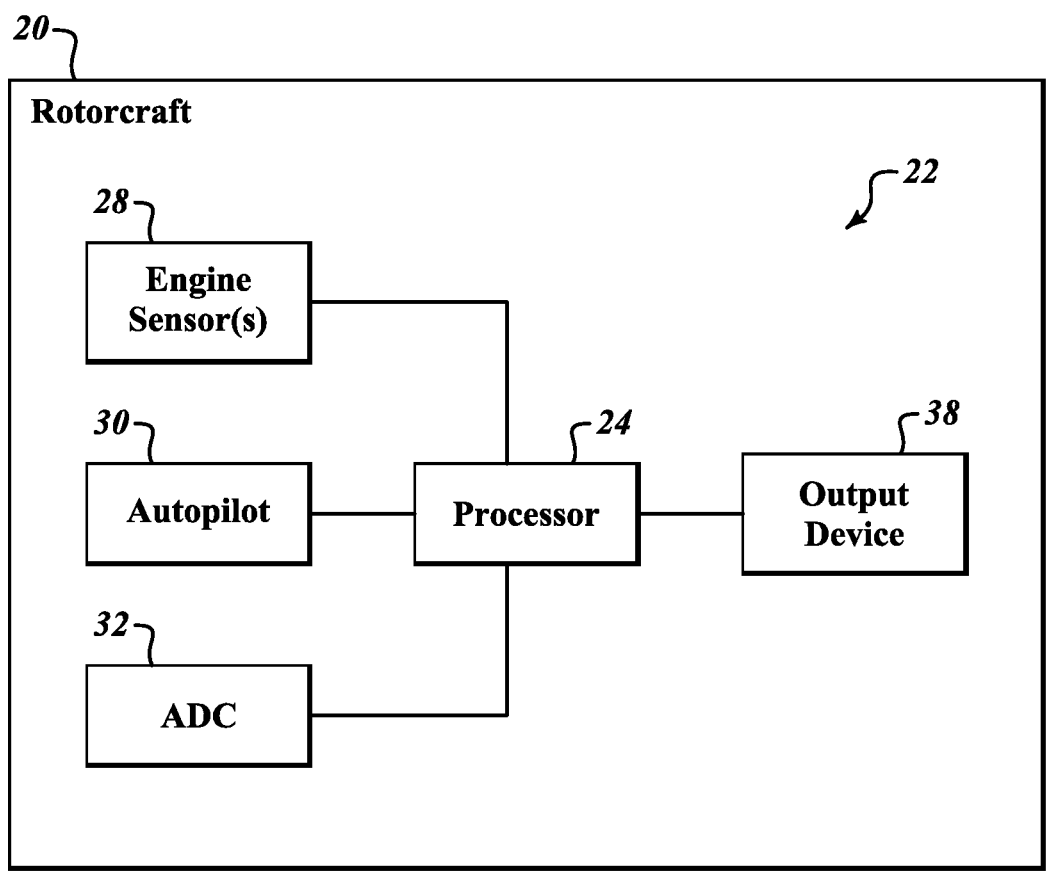
FIG. 1 is a block diagram of an exemplary system formed in accordance with an embodiment of the present invention.

FIG. 1 illustrates an exemplary rotorcraft (i.e., helicopter) 20 that includes a system 22 for alerting a rotary aircraft (i.e., helicopter) of a situation in which its airspeed drops below an acceptable level, in a situation where aircraft lift is compromised, for example, takeoff and a missed-approach go-around situation. The system 22 includes a processor 24 that is in signal communication with an engine sensor(s) 28, an autopilot system 30, an air data computer (ADC) 32, as well as various other avionic components (e.g., flight management system (FMS)). The processor 24 analyzes the information from the engine sensor(s) 28, the autopilot system 30, and the ADC 32 in order to determine whether the helicopter 20 has adequate speed in order to meet certain lift requirements needed for the situation that the helicopter 20 is currently in.

Figure 2:
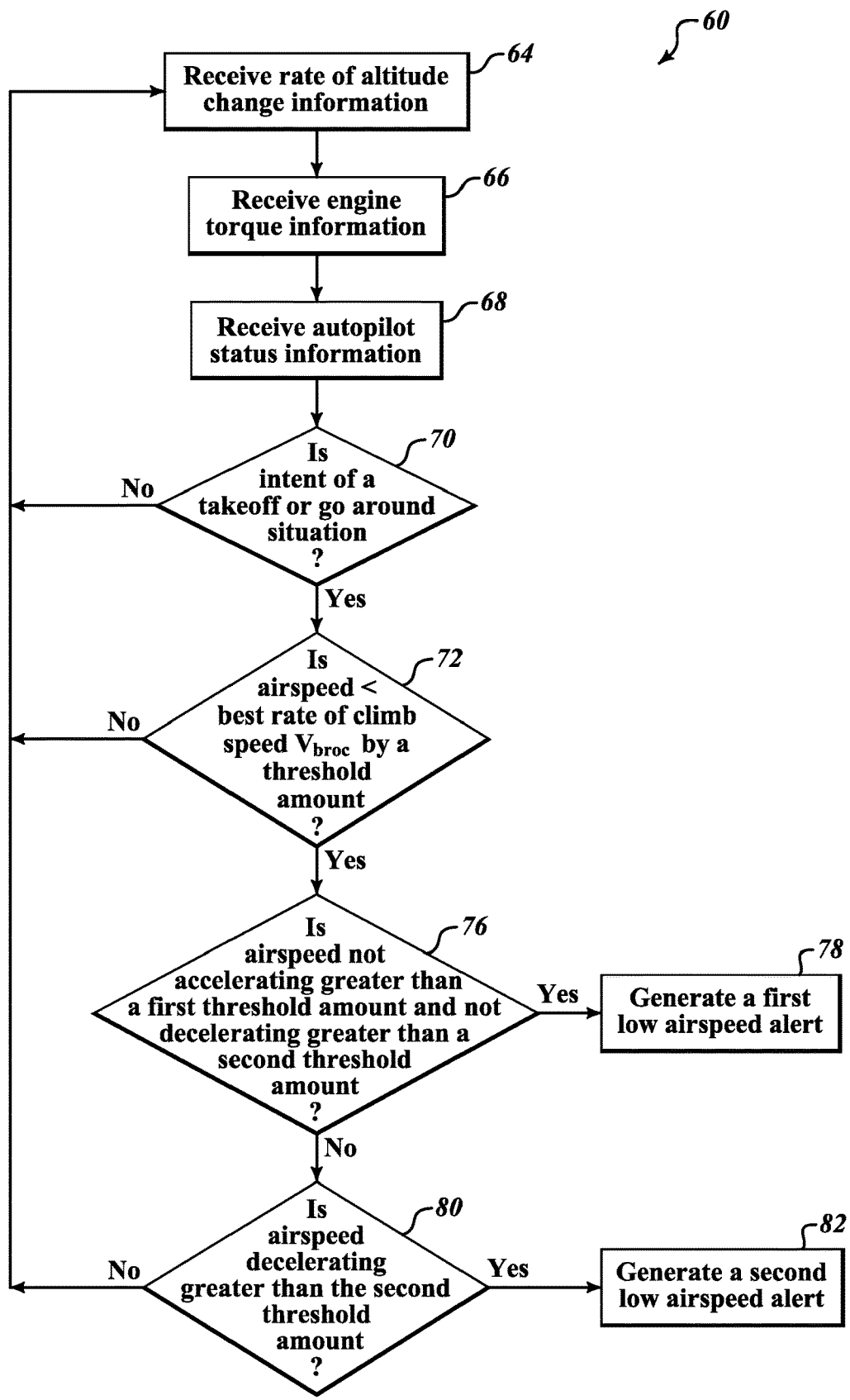
FIG. 2 is a flow diagram of an exemplary method performed by the system shown in FIG. 1.

FIG. 2 illustrates an exemplary process 60 performed by the system 22. First, at a block 64, the processor 24 receives rate-of-altitude change information from the ADC 32. Next, at a block 66, the processor 24 receives engine torque information from the engine sensor(s) 28. Then, at a block 68, the processor 24 receives autopilot status information from the autopilot system 30. The step performed at block 68 is optional, depending upon the amount of functionality desired for the system 22. The order of the steps may vary.

At a first decision block 70, the processor 24 determines intent of the helicopter 20, based on the received information. Intent may mean what the helicopter 20 is going to do or is currently doing. If the received information does not indicate intent of the helicopter 20 to be a takeoff or a go-around situation, then the process 60 returns to the beginning at block 64. If the intent is determined by the processor 24 to be a takeoff or a go-around situation, then, at a decision block 72, the processor 24 determines if the current airspeed, as generated by the ADC 32 is less than a predefined best rate-of-climb speed ($V_{broc}$), by a predefined threshold amount. If the processor 24 determines that the airspeed is not less than the $V_{broc}$ by the threshold amount, then the process 60 returns to the beginning at block 64. If the processor 24 determines that the airspeed is less than the $V_{broc}$ by the threshold amount, then the processor 24 determines, at a decision block 76, whether the current airspeed is not accelerating greater than a first threshold acceleration amount and the airspeed is not decelerating greater than a second threshold acceleration amount. If the processor 24 determines that the condition at decision block 76 is true, the processor 24 generates a first low-speed alert 78. However, if the airspeed does not meet the conditions set out in decision block 76, then the processor 24 determines if the airspeed is decelerating greater than the second threshold acceleration amount, as shown in decision block 80. If the airspeed is decelerating greater than the second threshold amount, then the processor 24 generates a second low-speed alert, at block 82. If, however, the airspeed is not decelerating greater than the second threshold acceleration amount, the process 60 returns to the beginning at block 64.

Figure 3:
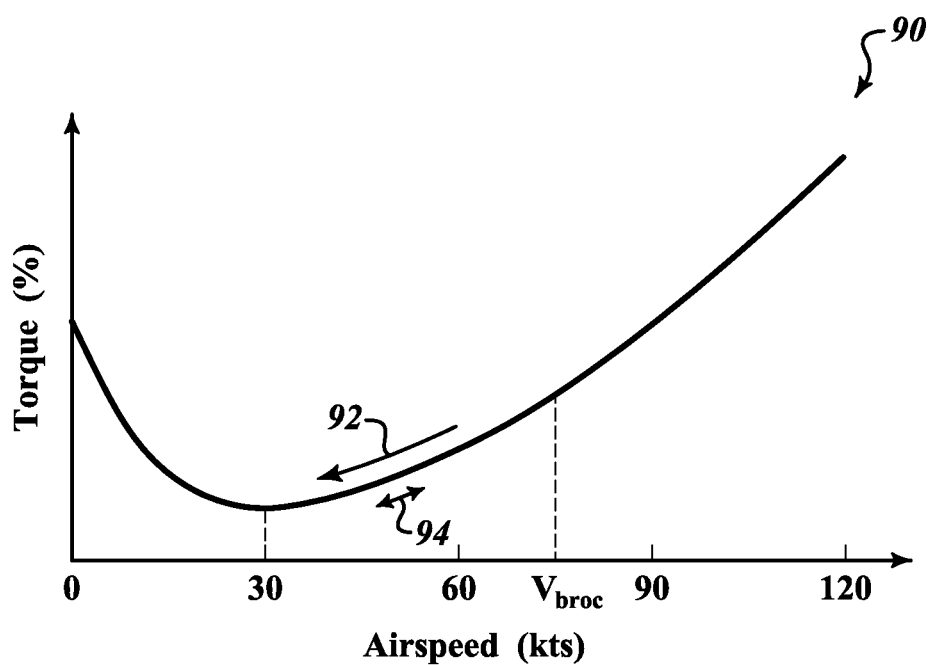
FIG. 3 is an exemplary rotorcraft torque-versus-speed graph.

FIG. 3 shows an exemplary graph 90 of torque-versus-airspeed for an exemplary helicopter. In one embodiment, an alert is outputted when the current airspeed is below the best rate-of-climb speed $V_{broc}$. Arrow 92 indicates the situation in which, when the airspeed is below $V_{broc}$, the airspeed is decelerating greater than the second threshold amount. The arrow 94 indicates the situation also below the $V_{broc}$ in which the airspeed is not accelerating greater than a first threshold amount and the airspeed is not decelerating greater than the second threshold amount. Thus, just because the airspeed is below the $V_{broc}$, an alert will not be presented to the flightcrew unless the acceleration situations, according to the process 60, are met. The generated first and second low-airspeed alerts are sent to the output device 38 for presentation to the flightcrew. Examples of the output device 38 include speakers, a display device, and/or a tactile feedback component.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention, in which an exclusive property or privilege is claimed, are defined as follows:

1. A method comprising:
   determining engine torque information with an engine sensor;

determining vehicle position and airspeed information of a vehicle with an air data computer;

receiving, at a processing device, the engine torque information, the vehicle position, and the airspeed information;

determining, at the processing device, if operation intent of vehicle meets at least one predefined criterion based on the received engine torque information, vehicle position, and airspeed information, the at least one predefined criterion being a take-off or a go-around condition;

if the intent meets the at least one predefined criterion, generating, at the processing device, a first low-speed alert with an output device if airspeed is less than a best rate-of-climb speed ($V_{broc}$) by a threshold amount and an acceleration value based on the airspeed is between a first acceleration value and a second acceleration value; and providing the first low-speed alert to an operator with an output device.

2. The method of claim 1, wherein if the intent meets the at least one predefined criterion based on the received engine torque information, vehicle position, and airspeed information, generating a second speed alert if the acceleration value is less than the second acceleration value; and providing the second low-speed alert to an operator with the output device.

3. The method of claim 1, further comprising at the processing device, receiving autopilot status information; and determining if operation intent of vehicle meets at least one predefined criterion, further based on the received autopilot status information.

4. The method of claim 1, wherein the providing the first low-speed alert to the operator with the output device includes providing the first low-speed alert to the operator with a display device.

5. The method of claim 1, wherein, if the operation intent of the vehicle fails to meet the at least one predefined criterion based on the received engine torque information, vehicle position, and airspeed information, then the processing device, without generating the first low-speed alert, continues to receive the engine torque information, the vehicle position, and the airspeed information until the processing device determines that the operation intent of the vehicle meets the at least one predefined criterion based on the received engine torque information, vehicle position, and airspeed information.

6. The method of claim 5, wherein, if the airspeed is not less than the best rate-of-climb speed ($V_{broc}$) by the threshold amount, or if the acceleration value based on the airspeed is not between the first acceleration value and the second acceleration value, then the processing device, without generating the first low-speed alert, continues to receive the engine torque information, the vehicle position, and the airspeed information until the processing device determines that the operation intent of the vehicle meets the at least one predefined criterion based on the received engine torque information, vehicle position, and airspeed information, the airspeed is less than the best rate-of-climb speed ($V_{broc}$) by the threshold amount, and the acceleration value based on the airspeed is between the first acceleration value and the second acceleration value.

7. A system for monitoring a condition of a rotorcraft, the system located in the rotorcraft, the system comprising:

an engine sensor configured to determine engine torque information of an engine of the rotorcraft;

an air data computer configured to determine position and airspeed information of the rotorcraft;

a processing device configured to receive the engine torque information, the position, and the airspeed information associated with the rotorcraft, the processing device configured to determine, based on the received torque, position, and airspeed information, when the rotorcraft is in a take-off condition or when the rotorcraft is in a go-around condition;

the processing device configured to generate a first low-speed alert when the rotorcraft is in the take-off condition or when the rotorcraft is in the go-around condition, and if :

(a) airspeed is less than a predetermined speed by a threshold amount and (b) an acceleration value is between a first and second acceleration value, the acceleration value being a rate of change of the airspeed; and an output device configured to present the first low-speed alert to an operator of the rotorcraft.

8. The system of claim 7, wherein the predetermined speed comprises a best rate-of-climb speed ($V_{broc}$).

9. The system of claim 7, the processing device configured to generate a second speed alert if the acceleration value is less than the second acceleration value, when the rotorcraft is in the take-off condition or when the rotorcraft is in the go-around condition, based on the received position and airspeed information, and wherein the output device is further configured to present the second speed alert to the operator of the rotorcraft.

10. The system of claim 7, further comprising:

an autopilot system to generate autopilot status information, and wherein the processing device receives the autopilot status information and determines when the rotorcraft is in the take-off condition or when the rotorcraft is in the go-around condition further based on the received autopilot status information.

11. A system for monitoring a condition of a vehicle, the system located in the vehicle, the system comprising:

a position and speed sensor configured to determine vehicle position and airspeed information;

a processing device configured to determine if operation intent of the vehicle meets at least one predefined criterion based on the determined vehicle position and airspeed information, operation intent comprising a take-off condition or a go-around condition; and if the operation intent meets the at least one predefined criterion, generate:

a first low-speed alert if (a) airspeed is less than a predetermined speed by a threshold amount and (b) an acceleration value based on the airspeed is between a first acceleration value and a second acceleration value; and an output device configured to present the first low-speed alert to an operator of the vehicle.

12. The system of claim 11, wherein the predetermined speed comprises a best rate-of-climb speed ($V_{broc}$).

13. The system of claim 11, wherein the processing device is further configured to generate a second speed alert if the acceleration value is less than the second acceleration value, if the intent meets the at least one predefined criterion, based on the determined vehicle position and airspeed information.

14. The system of claim 11, further comprising:
an autopilot system configured to generate autopilot status information,
wherein the processing device is further configured to determine if operation intent of the vehicle meets at least one predefined criterion, further based on the generated autopilot status information.

15. The system of claim 11, further comprising:
an engine sensor configured to determine engine torque information; and
wherein the processing device is further configured to determine if operation intent of vehicle meets at least one predefined criterion, further based on the determined engine torque information.

16. The system of claim 15, wherein,
if the operation intent of the vehicle fails to meet the at least one predefined criterion based on the received engine torque information, vehicle position, and airspeed information,
then the processing device, without generating the first low-speed alert, continues to
receive the engine torque information, the vehicle position, and the airspeed information until the processing device determines that the operation intent of the vehicle meets the at least one predefined criterion based on the received engine torque information, vehicle position, and airspeed information.

17. The system of claim 16, wherein,
if the airspeed is not less than the predetermined speed by the threshold amount, or
if the acceleration value based on the airspeed is not between the first acceleration and the second acceleration value,
then the processing device, without generating the first low-speed alert, continues to
receive the engine torque information, the vehicle position, and the airspeed information until the processing device determines that
the operation intent of the vehicle meets the at least one predefined criterion based on the received engine torque information, vehicle position, and airspeed information,
the airspeed is less than the best rate-of-climb speed ($V_{broc}$) by the threshold amount, and
the acceleration value based on the airspeed is between the first acceleration value and the second acceleration value.

18. The system of claim 11, further comprising:
an air data computer coupled to the processing device and configured to determine rate-of-altitude change information; and
wherein the processing device is further configured to determine if operation intent of vehicle meets at least one predefined criterion further based on the determined rate-of-altitude change information.

19. The system of claim 11, wherein the output device is a display device.

* * * * *